(12) United States Patent
Sun et al.

(10) Patent No.: US 11,722,318 B2
(45) Date of Patent: Aug. 8, 2023

(54) MESSAGE TRANSMISSION METHODS AND APPARATUSES

(71) Applicant: ALIPAY (HANGZHOU) INFORMATION TECHNOLOGY CO., LTD., Zhejiang (CN)

(72) Inventors: He Sun, Hangzhou (CN); Chao Zeng, Hangzhou (CN); Jiang Wang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,692

(22) Filed: Jun. 29, 2021

(65) Prior Publication Data
US 2021/0328812 A1 Oct. 21, 2021

(30) Foreign Application Priority Data
Sep. 25, 2020 (CN) .......................... 202011019924.8

(51) Int. Cl.
*H04L 9/32* (2006.01)
*H04L 9/08* (2006.01)
*H04L 9/00* (2022.01)

(52) U.S. Cl.
CPC .......... *H04L 9/3263* (2013.01); *H04L 9/0825* (2013.01); *H04L 9/3247* (2013.01); *H04L 9/50* (2022.05)

(58) Field of Classification Search
None
See application file for complete search history.

(56) References Cited

U.S. PATENT DOCUMENTS

| 10,417,217 B2 | 9/2019 | Pierce et al. |
| 10,757,084 B1 | 8/2020 | Yu |

(Continued)

FOREIGN PATENT DOCUMENTS

| CN | 1599350 | 3/2005 |
| CN | 102769889 | 11/2012 |

(Continued)

OTHER PUBLICATIONS

Jiang, L., et al., 2019. Joint transaction relaying and block verification optimization for blockchain empowered D2D communication. IEEE Transactions on Vehicular Technology, 69(1), pp. 828-841. (Year: 2019).*

(Continued)

*Primary Examiner* — Luu T Pham
*Assistant Examiner* — Edward X Long
(74) *Attorney, Agent, or Firm* — Fish & Richardson P.C.

(57) ABSTRACT

This specification provides a message transmission methods and apparatuses. One method includes: receiving a digital certificate sent by each blockchain node of a plurality of blockchain nodes in a blockchain relay communication network, wherein the digital certificate comprises identity information of each blockchain node of the plurality of blockchain nodes and a network identifier of a blockchain network of the blockchain relay communication network that comprises a corresponding blockchain node of the plurality of blockchain nodes; verifying that a digital signature of the digital certificate is authentic based on a public key of a certification authority (CA) issuing the digital certificate; and recording a mapping relationship between the identity information of each blockchain node of the plurality of blockchain nodes and the network identifier.

14 Claims, 6 Drawing Sheets

(56) References Cited

U.S. PATENT DOCUMENTS

| | | | |
|---|---|---|---|
| 2014/0022902 | A1 | 1/2014 | Uppunda et al. |
| 2017/0352027 | A1 | 12/2017 | Zhang et al. |
| 2018/0075028 | A1* | 3/2018 | Ruschin ............... G06F 16/27 |
| 2018/0212970 | A1 | 7/2018 | Chen et al. |
| 2019/0082007 | A1 | 3/2019 | Klarman et al. |
| 2019/0188706 | A1* | 6/2019 | McCurtis ............... G06Q 20/40 |
| 2019/0199787 | A1* | 6/2019 | Carver ............... H04L 45/64 |
| 2019/0320004 | A1 | 10/2019 | Allen et al. |
| 2020/0007464 | A1* | 1/2020 | Lo ............... H04L 9/0894 |
| 2020/0177572 | A1 | 6/2020 | Qui |
| 2020/0280453 | A1 | 9/2020 | Qiu |
| 2021/0314143 | A1* | 10/2021 | Conner ............... H04L 63/067 |

FOREIGN PATENT DOCUMENTS

| | | |
|---|---|---|
| CN | 103533569 | 1/2014 |
| CN | 103916423 | 7/2014 |
| CN | 104753980 | 7/2015 |
| CN | 105306232 | 2/2016 |
| CN | 109635585 | 4/2016 |
| CN | 107231299 | 10/2017 |
| CN | 107800795 | 3/2018 |
| CN | 107846718 | 3/2018 |
| CN | 108829749 | 11/2018 |
| CN | 109039847 | 12/2018 |
| CN | 109327528 | 2/2019 |
| CN | 109635165 | 4/2019 |
| CN | 109639550 | 4/2019 |
| CN | 109784881 | 5/2019 |
| CN | 109996306 | 7/2019 |
| CN | 110443704 | 11/2019 |
| CN | 110445882 | 11/2019 |
| CN | 110474846 | 11/2019 |
| CN | 110602201 | 12/2019 |
| CN | 110650189 | 1/2020 |
| CN | 110737664 | 1/2020 |
| CN | 110741400 | 1/2020 |
| CN | 110751475 | 2/2020 |
| CN | 111066286 | 4/2020 |
| CN | 111132258 | 5/2020 |
| CN | 111245745 | 6/2020 |
| CN | 111277549 | 6/2020 |
| CN | 111277562 | 6/2020 |
| CN | 111353175 | 6/2020 |
| CN | 111447290 | 7/2020 |
| CN | 111460457 | 7/2020 |
| CN | 111522833 | 8/2020 |
| KR | 20180129028 | 12/2018 |

OTHER PUBLICATIONS

Li, L., et al., 2018. Creditcoin: A privacy-preserving blockchain-based incentive announcement network for communications of smart vehicles. IEEE Transactions on Intelligent Transportation Systems, 19(7), pp. 2204-2220. (Year: 2018).* bitcoinfibre.org [online], "FIBRE," available no later than Jul. 2016, retrieved on Aug. 24, 2021, retrieved from URL<https://bitcoinfibre.org/>, 4 pages.

Bitcoinrelaynetwork.org [online], "The Bitcoin Relay Network," available no later than Jun. 28, 2015, retrieved on Aug. 24, 2021, retrieved from URL<bitcoinrelaynetwork.org/>, 3 pages.

Bloxroute.com [online], "BloxRoute," available on or before Dec. 2017, retrieved on Aug. 24, 2021, retrieved from URL<https://bloxroute.com/>, 8 pages.

Crosby et al., "BlockChain Technology: Beyond Bitcoin," Sutardja Center for Entrepreneurship & Technology Technical Report, Oct. 16, 2015, 35 pages.

falcon-net.org [online], "Falcon," available on or before Jun. 9, 2016, via Internet Archive: Wayback Machine URL<https://web.archive.org/web/20160609081540/https://www.falcon-net.org/>, retrieved on Aug. 24, 2021, URL<https://www.falcon-net.org/>, 4 pages.

Nakamoto, "Bitcoin: A Peer-to-Peer Electronic Cash System," www.bitcoin.org, 2005, 9 pages.

Ye et al., "BitXHub: Side-relay Chain Based Heterogeneous Blockchain Interoperable Platform," Computer Science, Jun. 2020, 47(6): 294-302 (with English abstract).

Extended European Search Report in European Application No. 21181360.5, dated Nov. 17, 2021, 10 pages.

Liu et al., "HyperService Interoperability and Programmability Across Heterogeneous Blockchains," Designing Interactive Systems Conference, Nov. 6, 2019, pp. 549-566.

* cited by examiner

MESSAGE TRANSMISSION METHODS AND APPARATUSES

CROSS-REFERENCE TO RELATED APPLICATIONS

This application claims priority to Chinese Patent Application No. 202011019924.8, filed on Sep. 25, 2020, which is hereby incorporated by reference in its entirety.

TECHNICAL FIELD

One or more embodiments of this specification relate to the field of blockchain technologies, and in particular, to message transmission methods and apparatuses.

BACKGROUND

The blockchain technology (also referred to as the distributed ledger technology) is a decentralized distributed database technology, featured by being decentralized, open, transparent, immutable, trustworthy, or the like, and is applicable to many application scenarios with high requirements on data reliability.

SUMMARY

In view of this, one or more embodiments of this specification provide message transmission methods and apparatuses.

To achieve the previously described objective, the one or more embodiments of this specification provide the following technical solutions:

According to a first aspect of the one or more embodiments of this specification, a message transmission method applicable to a relay node in a blockchain relay communication network is provided. The method includes:

receiving a digital certificate sent by each blockchain node, the digital certificate includes identity information of each blockchain node and network identifier information of a blockchain network to which the blockchain node belongs;

performing signature verification for the digital certificate by using a public key of a certification authority (CA) issuing the digital certificate, and associatively recording a mapping relationship between identity information of the each blockchain node and corresponding network identifier information in a case that the signature verification succeeds;

determining, in a case that a blockchain message sent by any blockchain node is received, receiver identity information of the blockchain message and target network identifier information of the any blockchain node, and determining, according to the mapping relationship, a target blockchain node matching the target network identifier information and the receiver identity information; and transmitting the blockchain message to the target blockchain node.

According to a second aspect of the one or more embodiments of this specification, a message transmission method applicable to a blockchain node is provided. The method includes:

obtaining a digital certificate issued to the blockchain node by a CA, the digital certificate includes identity information of the corresponding blockchain node and network identifier information of a blockchain network to which the blockchain node belongs; and sending the digital certificate to a relay node in a blockchain relay communication network, the relay node is configured to: perform, according to a public key of the CA, signature verification for the digital certificate sent by each blockchain node, and associatively record a mapping relationship between identity information of the blockchain nodes and corresponding network identifier information in a case that the signature verification succeeds; and determine, in a case that a blockchain message sent by any blockchain node is received, receiver identity information of the blockchain message and target network identifier information of the any blockchain node, and determine, according to the mapping relationship, a target blockchain node matching the target network identifier information and the receiver identity information, to transmit the blockchain message to the target blockchain node.

According to a third aspect of the one or more embodiments of this specification, a message transmission apparatus applicable to a relay node in a blockchain relay communication network is provided. The apparatus includes:

a receiving unit, configured to receive a digital certificate sent by each blockchain node, the digital certificate includes identity information of the corresponding blockchain node and network identifier information of a blockchain network to which the blockchain node belongs;

a verification unit, configured to: perform signature verification for the digital certificate by using a public key of a CA issuing the digital certificate, and associatively record a mapping relationship between identity information of the each blockchain node and corresponding network identifier information in a case that the signature verification succeeds;

a determining unit, configured to: determine, in a case that a blockchain message sent by any blockchain node is received, receiver identity information of the blockchain message and target network identifier information of the any blockchain node, and determine, according to the mapping relationship, a target blockchain node matching the target network identifier information and the receiver identity information; and a transmission unit, configured to transmit the blockchain message to the target blockchain node.

According to a fourth aspect of the one or more embodiments of this specification, a message transmission apparatus applicable to blockchain nodes is provided. The apparatus includes:

an obtaining unit, configured to obtain a digital certificate issued to the blockchain node by a CA, the digital certificate includes identity information of the corresponding blockchain node and network identifier information of a blockchain network to which the blockchain node belongs; and a sending unit, configured to: send the digital certificate to a relay node in a blockchain relay communication network, the relay node is configured to: perform, according to a public key of the CA, signature verification for the digital certificate sent by the blockchain node, and associatively record a mapping relationship between identity information of the blockchain node and corresponding network identifier information in a case that the signature verification succeeds; and determine, in a case that a blockchain message sent by any blockchain node is received, receiver identity information of the blockchain message and target network identifier information of the any blockchain node, and determine, according to the mapping relationship, a target blockchain node matching the target network identifier information and the receiver identity information, to transmit the blockchain message to the target blockchain node.

According to a fifth aspect of the one or more embodiments of this specification, an electronic device is provided, including:

a processor; and a memory configured to store instructions executable by the processor, the processor executes the executable instructions to implement the method according to the first aspect or the second aspect.

According to a sixth aspect of the one or more embodiments of this specification, a computer-readable storage medium is provided, the computer-readable storage medium stores computer instructions, the instructions implement the steps of the method according to the first aspect or the second aspect when executed by a processor.

DESCRIPTION OF THE EMBODIMENTS

Explanatory embodiments are described in detail herein, and examples of the explanatory embodiments are shown in the accompanying drawings. When the following description involves the accompanying drawings, unless otherwise indicated, the same numerals in different accompanying drawings represent the same or similar elements. The implementations described in the following explanatory embodiments are not all the implementations consistent with one or more embodiments of this specification, but are instead only examples of methods and apparatuses that are described in detail in the appended claims and that are consistent with some aspects of one or more embodiments of this specification.

It should be noted that in other embodiments, the steps of corresponding methods are not necessarily performed based on a sequence shown and described in this specification. In some other embodiments, the methods can include more or fewer steps than those described in this specification. In addition, a single step described in this specification may be divided into a plurality of steps for description in other embodiments, and a plurality of steps described in this specification may be combined into a single step for description in other embodiments.

Figure 1:
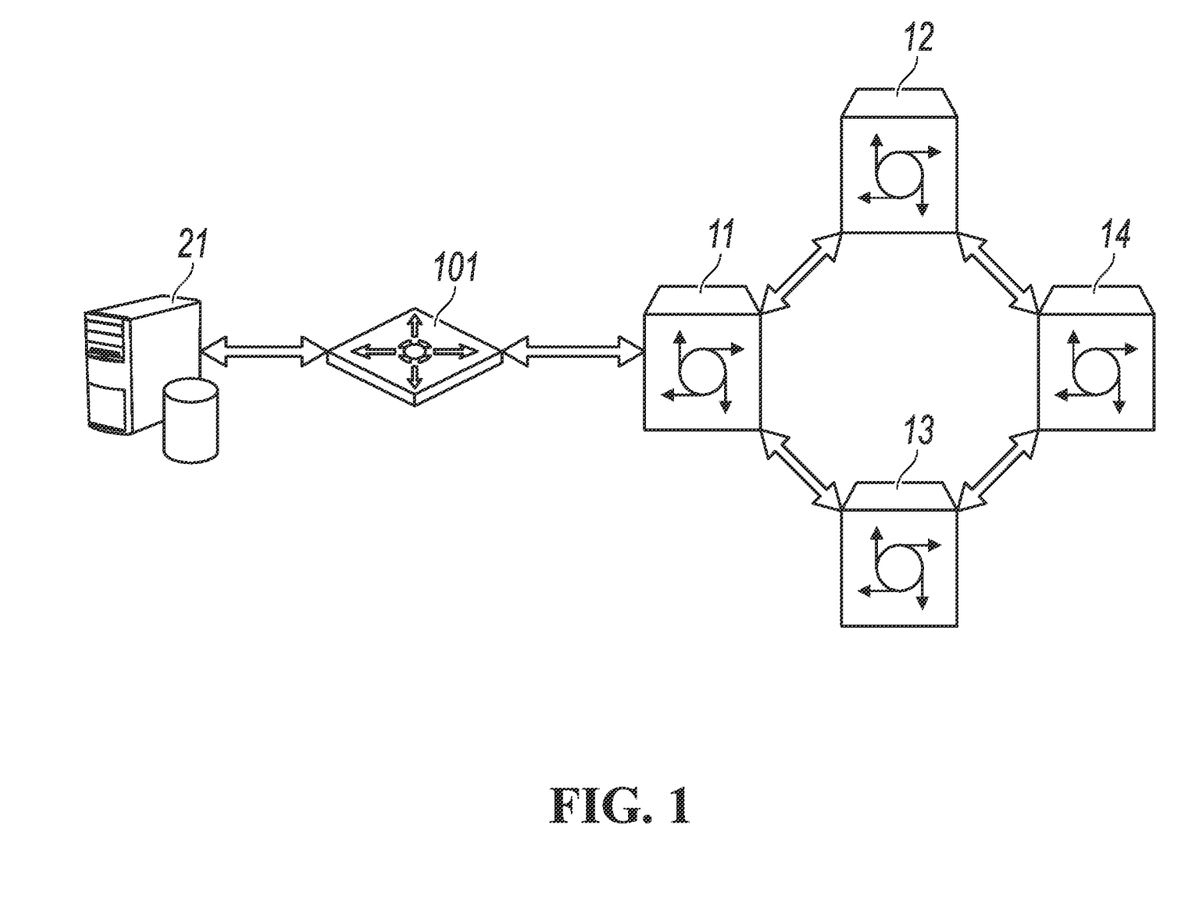
FIG. 1 is a schematic diagram showing interaction between a blockchain node and a blockchain relay communication network according to an explanatory embodiment.

FIG. 1 is a schematic diagram showing interaction between a blockchain node and a blockchain relay communication network according to an explanatory embodiment. As shown in FIG. 1, assume that a blockchain relay communication network includes a plurality of relay nodes such as a relay 11, a relay 12, a relay 13, and a relay 14. By using the relay 11 as an example, the relay 11 can be connected to anode 21 in a blockchain network by using a gateway 101. Similarly, other relay nodes can also be connected to other blockchain nodes in the blockchain network. The gateway 101 is configured to assist the node 21 to access the blockchain relay communication network. The gateway 101 is logically equivalent to a blockchain node in the blockchain network, but the gateway 101 does not participate in blockchain consensus. In this way, the node 21 can communicate with the gateway 101 by using a communication protocol adopted by the blockchain network, and the gateway 101 does not have a negative impact on processes such as the consensus process in the blockchain network. The gateway 101 is substantially an adaptation program for the node 21 to access the blockchain relay communication network. The adaptation program can be deployed on the node 21, the relay 11, or other devices independent of the relay 11 and the node 21. This is not limited in this specification.

The blockchain network includes a plurality of blockchain nodes, and communication operations such as consensus, transaction transmission, and block synchronization need to be implemented between the blockchain nodes. In the related art, a peer-to-peer (P2P) technology is directly used for communication between the blockchain nodes to transmit transactions, blocks, or the like, but due to various network factors, a communication delay is long and stability is poor, which cannot satisfy application needs. Therefore, similar to the node 21, each blockchain node can access a relay node in the blockchain relay communication network. In this way, the blockchain nodes can communicate with each other by using the blockchain relay communication network. The blockchain relay communication network is a backbone relay communication network for real-time transmission in blockchain, and the relay nodes can communicate and interact with each other by using high-quality bandwidth with a high QoS guarantee. Therefore, the blockchain relay communication network takes over an intermediate link of communication between the blockchain nodes, which can reduce the communication delay and improve the stability, thereby significantly improving communication quality between the blockchain nodes.

The blockchain relay communication network is applicable to various types of blockchain networks, including a public blockchain, a private blockchain, a consortium blockchain, or the like. For example, blockchain relay communication networks applied to the public blockchain mainly include Falcon, Fast Bitcoin Relay Network (FBRN), Fast Internet Bitcoin Relay Engine (FIBRE), or the like, and blockchain relay communication networks applied to the consortium blockchain mainly include BloXRoute, Blockchain Transmission Network (BTN), or the like.

In the related art, a blockchain relay communication network can simultaneously access a plurality of blockchain networks, that is, support a plurality of blockchains to perform message transmission simultaneously. Because a relay node interfaces with a plurality of blockchain nodes that respectively belong to different blockchain networks, to prevent a message in each blockchain network from being leaked to other blockchain network, the relay node needs ensure that a to-be-transmitted message is transmitted between blockchain nodes belonging to the same blockchain network, and is not transmitted to other blockchain network.

Figure 2:
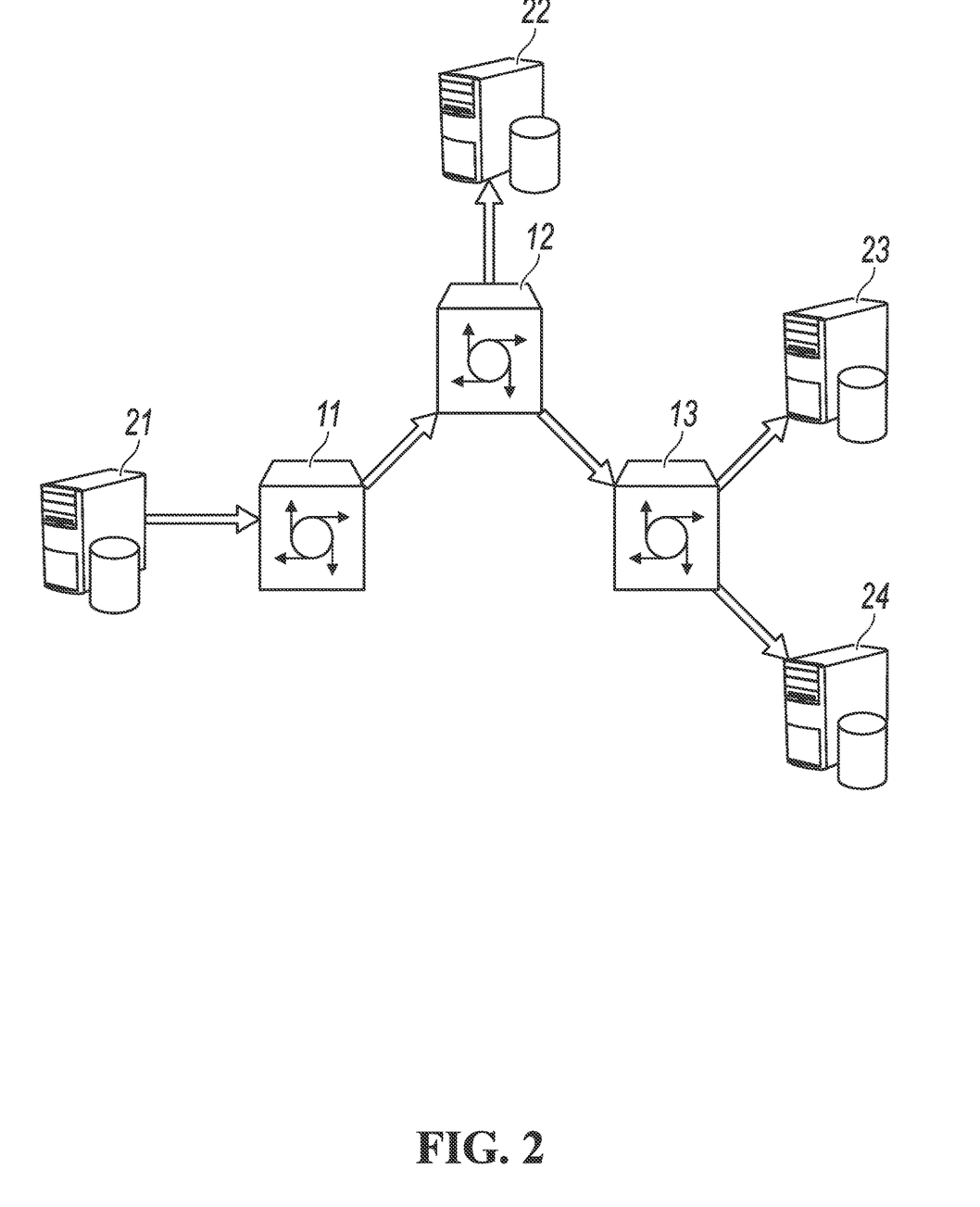
FIG. 2 is a schematic diagram of a message transmission scenario according to an explanatory embodiment.

A message transmission scenario shown in FIG. 2 is used as an example. The node 21 is connected to the relay 11 in the blockchain relay communication network, a node 22 is connected to the relay 12, and a node 23 and a node 24 are connected to the relay 13. Certainly, the relay 11 can alternatively be respectively connected to the nodes 21 to 24. To facilitate understanding, the previously-mentioned gateway (such as the gateway 101) is omitted herein. Assume that a distribution of the nodes 21 to 24 in the blockchain network is shown in Table 1:

TABLE 1

| Node | Blockchain network to which the node belongs | Node ID |
| --- | --- | --- |
| Node 21 | Blockchain network 1 | Node a |
| Node 22 | Blockchain network 1 and blockchain network 2 | Node b |
| Node 23 | Blockchain network 1 | Node c |
| Node 24 | Blockchain network 2 | Node c |

As shown in Table 1, the node 21 is the node a in the blockchain network 1, and the node 22 is simultaneously used as a blockchain node in the blockchain network 1 and in the blockchain network 2 (for example, the node 22 simultaneously maintains data of the blockchain network 1 and the blockchain network 2, where data between the blockchain network 1 and the blockchain network 2 is stored separately). The node 23 and the node 24 are respectively blockchain nodes in the blockchain network 1 and in the blockchain network 2, but both node IDs of the two nodes are the node c.

In a case, as the node a in the blockchain network 1, the node 21 needs to transmit a message to the node b that also belongs to the blockchain network 1, so that the node 21 instructs the blockchain relay communication network to transmit the message to the node b. Assume that the node b is used as a blockchain node b1 in the blockchain network 1 at a logic level, and is used as a blockchain node b2 in the blockchain network 2 at a logic level. The relay node in the blockchain relay communication network cannot determine whether the to-be-transmitted message is transmitted to the blockchain node b1 or the blockchain node b2. For example, the relay node cannot determine whether to establish a channel 1, configured for transmitting a message in the blockchain network 1, with the node b, or to establish a channel 2, configured for transmitting a message in the blockchain network 2, with the node b.

In another case, as the node a in the blockchain network 1, the node 21 needs to transmit a message to the node c that also belongs to the blockchain network 1, so that the node 21 instructs the blockchain relay communication network to transmit the message to the node c. The relay node in the blockchain relay communication network cannot determine whether the to-be-transmitted message is transmitted to the node c belonging to the blockchain network 1 (that is, the node 23) or the node c belonging to the blockchain network 2 (that is, the node 24). For example, the relay node cannot determine whether to establish a channel 1, configured for transmitting a message in the blockchain network 1, with the node c in the blockchain network 1, or to establish a channel 2, configured for transmitting a message in the blockchain network 2, with the node c in the blockchain network 2.

As can be seen, in the previously described cases, the relay node has a risk of leaking a message in a blockchain network to other blockchain network. To avoid the risk and ensure that the to-be-transmitted message is transmitted between blockchain nodes belonging to the same blockchain network, this specification provides a new message transmission solution.

Figure 3:
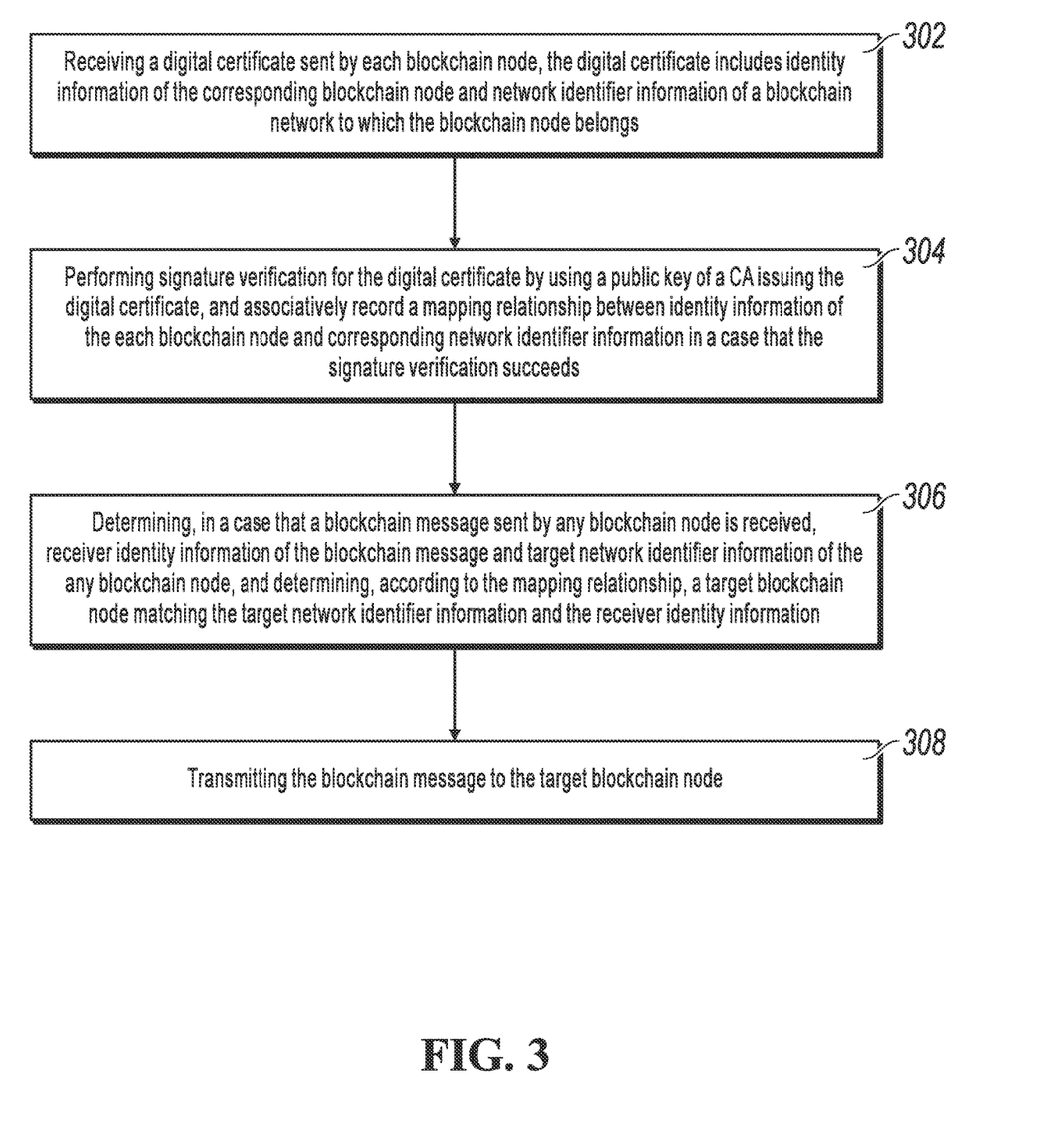
FIG. 3 is a flowchart of a message transmission method according to an explanatory embodiment.

FIG. 3 is a flowchart of a message transmission method according to an explanatory embodiment. As shown in FIG. 3, the method is applicable to a relay node in a blockchain relay communication network. The method can include the following steps.

Step 302: Receiving a digital certificate sent by each blockchain node, the digital certificate includes identity information of the corresponding blockchain node and network identifier information of a blockchain network to which the blockchain node belongs.

When a blockchain network applies to access the blockchain relay communication network, a blockchain node in the blockchain network needs to apply for a digital certificate from a CA of the blockchain relay communication network first. In other words, the CA issues the digital certificate to each blockchain node (which can belong to the same blockchain network or different blockchain networks), the issued digital certificate includes identity information of the corresponding blockchain node and network identifier information of a blockchain network to which the blockchain node belongs. As a unique identifier of the blockchain network, the network identifier information is used for indicating an identity of the blockchain network, to distinguish the blockchain network from other blockchain networks. For example, the CA can generate a corresponding blockchain ID for each blockchain network. That is, blockchain nodes in the same blockchain network have the same blockchain ID, and blockchain IDs of blockchain nodes that belong to different blockchain networks are different.

In an explanatory embodiment, the network identifier information of the blockchain network to which each blockchain node belongs can be generated by the CA based on a genesis block maintained by the each blockchain node. For different blockchain nodes belonging to the same blockchain network, the same genesis block is maintained. Therefore, network identifier information generated based on the genesis block can be used as network identifier information of the blockchain network. That is, the CA generates network identifier information based on a genesis block maintained by a blockchain node, so that for blockchain nodes belonging to the same blockchain network, the same network identifier information is generated, and for blockchain nodes belonging to different blockchain networks, generated network identifier information is also different. Therefore, blockchain nodes in different blockchain networks can be distinguished based on network identifier information subsequently. Certainly, network identifier information can alternatively be generated based on other predetermined blocks. For example, the predetermined block can be a $10^{th}$ block, a $100^{th}$ block, or a $166^{th}$ block, etc. Provided that network identifier information is generated based on a uniformly designated block, this is not limited in this specification.

A situation of the genesis block is used as an example for description. Code logic for generating the genesis block of the blockchain network can be defined in chain code of the blockchain network. In this case, for a blockchain node newly added to a blockchain network, chain code corresponding to the blockchain network is configured in the blockchain node, so that the blockchain node can generate a genesis block by executing the code logic, to complete a subsequent process of accessing the blockchain relay communication network. Alternatively, for a blockchain node newly added to a blockchain network, the blockchain node can duplicate block data (for example, can only duplicate data of a genesis block, or can duplicate data of all blocks) from other blockchain nodes of the blockchain network to obtain the genesis block, so as to complete a subsequent process of accessing the blockchain relay communication network based on the genesis block.

Further, each blockchain node can perform hash calculation on a genesis block maintained by the blockchain node to obtain a corresponding genesis block hash value, and then send the generated genesis block hash value, and a node public key and a node ID (that is, node identifier information) of the blockchain node to the CA, so that the CA performs authentication on the data. An authentication rule for blockchain nodes can be configured in the CA, the authentication rule is used for determining whether a blockchain node has qualification for being granted a digital certificate. Certainly, specific contents of the authentication rule can be flexibly set based on actual needs. This is not limited in this specification. Further, the CA can generate a chain ID based on the genesis block hash value, to generate a digital certificate based on the chain ID, the node public key, and the node ID, and return the digital certificate to the corresponding blockchain node. For example, the CA can sign, by using a private key of the CA, the chain ID, the node public key, and the node ID that are included in the digital certificate, and record a signature in the digital certificate. In addition, the CA can record the generated chain ID locally.

It should be noted that other devices distinguished from all relay nodes in the blockchain relay communication network can be configured as the CA, to provide a digital certificate issuance service for each blockchain node. Alternatively, one or more relay nodes in the blockchain relay communication network can be configured as the CA. For example, a certificate authority service (that is, a CA service) can be built in each relay node, but generally only some relay nodes in the network will start the CA service. Typically, only one relay node starts the CA service, to provide a digital certificate issuance service for each blockchain node.

Step 304: Performing signature verification for the digital certificate by using a public key of a CA issuing the digital certificate, and associatively record a mapping relationship between identity information of the each blockchain node and corresponding network identifier information in a case that the signature verification succeeds.

After obtaining the digital certificate issued by the CA to the blockchain node, the blockchain node can request to establish a connection with the blockchain relay communication network, to show the digital certificate of the blockchain node to the blockchain relay communication network for the relay node to perform verification, so as to complete access to the blockchain relay communication network. For example, the blockchain node can be connected to the relay node in the blockchain relay communication network by using a secure sockets layer (SSL), and establish the connection with the relay node to transmit data.

When issuing the digital certificate to the blockchain node, the CA uses a private key of the CA to sign contents included in the digital certificate, so that after the relay node obtains the digital certificate provided by the blockchain node, the relay node can perform signature verification for the digital certificates by using the public key of the CA, to determine whether to allow the blockchain node to access the blockchain relay communication network. After the verification succeeds, a mapping relationship between node identifier information of the each blockchain node and corresponding network identifier information can be associatively recorded, so that a receiver of a to-be-transmitted blockchain message can be accurately found by using the mapping relationship subsequently. Certainly, if the verification fails, the blockchain node is forbidden to access the blockchain relay communication network.

To prevent a blockchain node from counterfeiting other blockchain nodes, an identity of the blockchain node providing a digital certificate can further be verified. Specifically, identity information included in the digital certificate can include node identifier information and/or a node public key of the corresponding blockchain node. For a case in which the digital certificate provided by the blockchain node includes the node public key and the node identifier information (that is, a node ID) of the blockchain node (that is, a case in which the identity information includes the node identifier information and the node public key), the blockchain node signs the node identifier information by using a node private key of the blockchain node. In this way, in a case that signature verification for the digital certificate of the blockchain node succeeds, the relay node can perform, by using the node public key included in the digital certificate, signature verification for the node identifier information included in the digital certificate. When the signature verification succeeds, it is determined that the identity of the blockchain node is correct. Further, in a case that the signature verification for the node identifier information succeeds, the relay node can establish a transmission channel with the corresponding blockchain node, the transmission channel is configured for transmitting a blockchain message between the relay node and the blockchain node. For example, the relay node can establish a persistent connection with the blockchain node for use of blockchain message transmission subsequently.

In addition to that the relay node verifies the blockchain node, the blockchain node can also correspondingly verify the relay node, to prevent other devices from counterfeiting a relay node. That is, the relay node and the blockchain node can exchange digital certificates with each other for verification. Specifically, similar to applying for a digital certificate by the blockchain node, the relay node can also apply for a digital certificate from the CA. For example, the relay node can provide description information (a node ID, a node public key, a network identifier of the blockchain relay communication network, a software version, and the like) of the relay node for the CA, for the CA to perform verification. After the verification succeeds, the CA can issue the digital certificate to the relay node. Similarly, the relay node can send the digital certificate of the relay node to each blockchain node. After obtaining the digital certificate of the relay node, the blockchain node can perform signature verification for the digital certificate by using the public key of the CA. If the signature verification succeeds, the blockchain node determines that an identity of the relay node is correct, so as to provide the digital certificate of the blockchain node for the relay node.

Step 306: Determining, in a case that a blockchain message sent by any blockchain node is received, receiver identity information of the blockchain message and target network identifier information of the any blockchain node, and determining, according to the mapping relationship, a target blockchain node matching the target network identifier information and the receiver identity information.

Blockchain messages transmitted between blockchain nodes in the same blockchain network can include at least one of the following: block synchronization messages, consensus messages, and transaction synchronization messages. For example, when a blockchain node is newly added to a blockchain network, the blockchain node can obtain existing block data from other blockchain nodes, to implement synchronization of the block data. In this way, the block data transmitted to the blockchain node by the other blockchain nodes is the block synchronization message. In another example, when each blockchain node in a blockchain network is performing consensus, data that needs to be transmitted between each blockchain node for performing consensus is the consensus message. For another example, when each blockchain node in a blockchain network is performing consensus on a transaction, a blockchain node receiving the transaction submitted by a client device transmits the transaction to other blockchain nodes, to complete a subsequent consensus process. In this case, the transaction is the transaction synchronization message.

A blockchain message transmitted by any blockchain node can record identity information of a receiver (referred to as receiver identity information for short below) of the blockchain message and network identifier information of a blockchain network to which the blockchain node (that is, a sender of the blockchain message) belongs (referred to as target network identifier information for short below). In this way, after obtaining the blockchain message, the relay node can read the receiver identity information and the target network identifier information, and then search, based on the recoded mapping relationship, the mapping relationship for a blockchain node that matches both the receiver identity information and the target network identifier information as a target blockchain node.

It can been determined that, based on the mapping relationship in which the identity information of the each blockchain node and the corresponding network identifier information is associatively recorded, an identity of a blockchain node can be jointly marked at both a node level and a network level, that is, the blockchain node can be jointly located by using a node identifier and a network identifier, thereby avoiding a risk of the relay node leaking a message in a blockchain network to other blockchain network, implementing data isolation between blockchain networks, and ensuring that a to-be-transmitted message is transmitted between blockchain nodes belonging to the same blockchain network.

Step 308: Transmitting the blockchain message to the target blockchain node.

After determining the target blockchain node, the relay node can further determine a target relay node connected to the target blockchain node in the blockchain relay communication network, to transmit the blockchain message to the target blockchain node by using the target relay node.

The relay node can use both a node ID and a corresponding chain ID to jointly mark an identity of a blockchain node. A description is provided based on the examples in FIG. 2 and Table 1, as shown in Table 2.

TABLE 2

| Node | Identity of a blockchain node |
| --- | --- |
| Node 21 | Blockchain network 1-node a |
| Node 22 | Blockchain network 1-node b, blockchain network 2-node b |
| Node 23 | Blockchain network 1-node c |
| Node 24 | Blockchain network 2-node c |

As shown in Table 2, the node 22 is simultaneously used as a blockchain node in the blockchain network 1 and in the blockchain network 2. Therefore, the node 22 has two identities, which are "blockchain network 1-node b" (that is, the previously described blockchain node b1) and "blockchain network 2-node b" (that is, the previously described blockchain node b2) respectively. The two identities can be distinguished from chain IDs. Although node IDs of the node 23 and the node 24 are the same, the node 23 and the node 24 belong to the blockchain network 1 and the blockchain network 2 respectively. Therefore, the two nodes can be also distinguished from chain IDs.

For example, as the node a in the blockchain network 1, the node 21 needs to transmit a blockchain message to the node b that also belongs to the blockchain network 1 (that is, the blockchain node b1 at a logic level), and can record a chain ID "blockchain network 1" of the node 21 and a node ID "node b" of the target blockchain node in the blockchain message. In this way, after receiving the blockchain message transmitted by the node a, the relay node can read the chain ID "blockchain network 1" and the node ID "node b", and then search the recorded mapping relationship for a blockchain node that matches both the chain ID "blockchain network 1" and the node ID "node b" as a target blockchain node. For example, the relay node can perform matching and fit the mapping relationship "blockchain network 1-node b", then determine the target blockchain node as the node b belonging to the blockchain network 1 (that is, the blockchain node b1 at a logic level), and then establish a transmission channel corresponding to the blockchain network 1 (for example, a persistent connection) with the node b. The transmission channel is dedicated to transmitting a blockchain message in the blockchain network 1 between the relay node and the node a, and cannot transmit blockchain messages in the blockchain network 2. That is, the transmission channel and the blockchain network have a one-to-one correspondence.

In another example, as the node a in the blockchain network 1, the node 21 needs to transmit a blockchain message to the node c that also belongs to the blockchain network 1, and can record a chain ID "blockchain network 1" of the node 21 and a node ID "node c" of the target blockchain node in the blockchain message. In this way, after receiving the blockchain message transmitted by the node a, the relay node can read the chain ID "blockchain network 1" and the node ID "node c", and then search the recorded mapping relationship for a blockchain node that matches both the chain ID "blockchain network 1" and the node ID "node c" as a target blockchain node. For example, the relay node can perform matching and fit the mapping relationship "blockchain network 1-node c", then determine the target blockchain node as the node c belonging to the blockchain network 1 (that is, the node 23), instead of the node c belonging to the blockchain network 2 (that is, the node 24), and then establish a transmission channel corresponding to the blockchain network 1 with the node 23. The transmission channel is dedicated to transmitting a blockchain message in the blockchain network 1 between the relay node and the node 23.

In the message transmission solution of this specification, a blockchain node set can further be defined to save communication resources, and more efficient communication is implemented by using the blockchain relay communication network. Detailed description is provided below.

A message transmission scenario shown in FIG. 2 is used as an example. When the node 21 needs to send a message to the node 22 and the node 23, the node 21 first sends the message to the relay 11, and the relay 11 forwards the message to the relay 12. The relay 12 forwards the message to the node 22, and also forwards the message to the relay 13. The relay 13 respectively forwards the message to the node 23 and the node 24. In this way, the node 22 and the node 23 finally receive the message from the node 21, but the node 24 also receives the message. Actually, the operation of the relay 13 of forwarding the message to the node 24 is unnecessary, and wastes communication resources.

Therefore, the blockchain relay communication network can be layered on a control plane and a data plane, and a forwarding control policy of network data can be separated from the data transmission process, so that the forwarding control policy can be flexibly defined, and the data transmission can be more general and efficient. For the blockchain relay communication network, the control plane can be understood as a message routing policy, and the data plane refers to transmission of a blockchain message in the blockchain relay communication network. By submitting a registration request, a blockchain node can flexibly configure a blockchain node set to which blockchain node belongs based on application (or service) needs, to adjust a message routing related to the blockchain node.

In the previously described manner, the transmission process of the blockchain message in the blockchain relay communication network is optimized. The previously described nodes 21 to 24 are still used as an example: assume that the node 21 intends to send a blockchain message to the node 22 and the node 23. If the node 22 and the node 23 are added to the same blockchain node set in advance, the node 21 only needs to mark a sending target of the blockchain message as the blockchain node set, to ensure that the blockchain relay communication network only sends the blockchain message to the node 22 and the node 23 that belong to the blockchain node set. For example, the node 21 sends the blockchain message to the relay 11, the relay 11 forwards the blockchain message to the relay 12, the relay 12 forwards the blockchain message to the node 22 and the relay 13, and the relay 13 respectively forwards the blockchain message to the node 23, thereby avoiding sending the blockchain message to other relay nodes and blockchain nodes, so as to avoid waste of the communication resources.

In an embodiment, a blockchain node can be added to a blockchain node set by sending a registration request to the relay node in advance. In this way, the relay node can register, based on a registration request submitted by each blockchain node, the each blockchain node to a blockchain node set indicated by the corresponding registration request.

If the registration request includes a set identifier, the relay node can register the blockchain node initiating the registration request to a blockchain node set corresponding to the set identifier. If the blockchain node set corresponding to the set identifier is created in advance, it's equivalent to that the blockchain node is added to the blockchain node set; if the blockchain node set corresponding to the set identifier is not created in advance, it's equivalent to that the blockchain node set is created and the blockchain node is added to the blockchain node set.

If the registration request does not include a set identifier, the relay node can register the blockchain node initiating the registration request to a default blockchain node set. The default blockchain node set can include all blockchain nodes in a blockchain network to which the blockchain node initiating the registration request belongs; or, the default blockchain node set can be other predefined blockchain node sets, which depends on a predefined policy adopted by the blockchain relay communication network.

In another embodiment, a blockchain node set can be obtained through division by the CA. That is, at a stage in which a blockchain node applies for a digital certificate from the CA, the blockchain node is added to a corresponding blockchain node set. In a case, the division can be similar to registering the blockchain node to a blockchain node set indicated by the registration request in the previously described registration request manner. Reference can be made to the previous descriptions, and details are not described herein again. In another case, the CA can divide, based on a predefined division policy, blockchain nodes applying for digital certificates. Certainly, the division policy can be flexibly set based on actual needs. This is not limited in this specification.

Regardless of which case, after a blockchain node set is obtained through division, when the CA issues digital certificate to a blockchain node, the CA can record a set identifier of blockchain node set to which each blockchain node belong in the corresponding digital certificate of the each blockchain node. In this way, when the blockchain node provides the digital certificate to the relay node to complete access to the blockchain relay communication network subsequently, the relay node can respectively register, in a case that signature verification for the digital certificate succeeds, the blockchain node to the blockchain node set indicated by the set identifier included in the corresponding digital certificate. That is, the relay node maintains node members in the blockchain node set.

When a blockchain node is not added to any blockchain node set, a corresponding routing policy of the blockchain node in the blockchain relay communication network only involves a node ID of the blockchain node and a relay ID of a relay node connected to the blockchain node. For example, a routing policy corresponding to the node 21 in FIG. 2 is "node 21-relay 11", and a routing policy corresponding to the node 22 is "node 22-relay 12", or the like. After the blockchain node is added to the blockchain node set, information related to the blockchain node set is added to the routing policy corresponding to the blockchain node in the blockchain relay communication network. For example, when the node 21 is added to a blockchain node set SID1, the routing policy corresponding to the node 21 can be updated from the "node 21-relay 11" to "SID1/node 21-relay 11", indicating that the node 21 belongs to the blockchain node set SID1.

Figure 4:
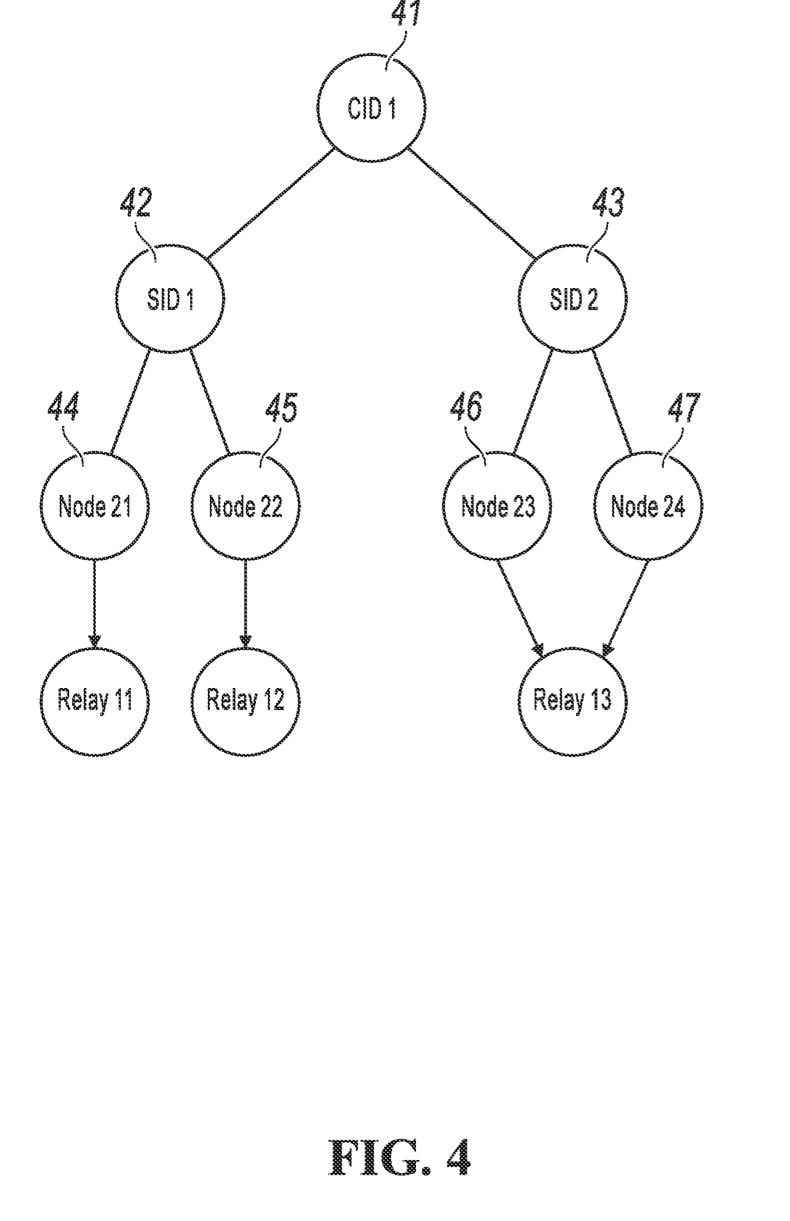
FIG. 4 is a schematic diagram of a tree-type routing table according to an explanatory embodiment.

There can be a hierarchical relationship between the blockchain node sets. Based on the hierarchical relationship, the blockchain node sets to which the blockchain nodes belong, and the connection relationship between the blockchain nodes and the relay nodes, the routing policies corresponding to the blockchain nodes in the blockchain relay communication network can be formed into a tree structure, that is, a tree-structure routing table. For example, as shown in FIG. 4, assume that the node 21 and the node 22 belong to the blockchain node set SID1, the node 23 and the node 24 belong to a blockchain node set SID2, and the blockchain node set SID1 and the blockchain node set SID2 both belong to a blockchain node set CID1 (therefore, the nodes 21 to 24 actually belong to the blockchain node set CID1). Therefore, the blockchain node set CID1 corresponds to a root node 41 in the tree-structure routing table, the blockchain node set SID1 and the blockchain node set SID2 respectively correspond to leaf nodes 42 to 43 of the root node 41 in the tree-structured routing table, the node 21 and the node 22 respectively correspond to leaf nodes 44 and 45 of a node 42 in the tree-structure routing table, the node 23 and the node 24 respectively correspond to leaf nodes 46 and 47 of a node 43 in the tree-structure routing table, and the nodes 44 to 47 are leaf nodes of the tree-structure routing table. Moreover, values of these leaf nodes are relay IDs of connected relay nodes. For example, the node 21 is connected to the relay 11, so that a value of the leaf node 44 is the relay 11, and the like.

Certainly, the tree-structure routing table shown in FIG. 4 shows routing relationships at a logical level, and the relay node usually adopts other forms when actually recording the routing relationships. For example, for each blockchain node, the relay node can generate a routing policy corresponding to the blockchain node based on a path from the root node to the leaf node corresponding to the blockchain node, and separate adjacent nodes by a predefined separator, so that a routing policy corresponding to the node 21 can be CID1/SID1/Node1: tn1, where Node1 is a node ID of the node 21 and tn1 is a relay ID of the relay 11. Similarly, a routing policy corresponding to the node 23 can be CID1/SID2/Node3:tn3, where Node3 is a node ID of the node 23, tn3 is a relay ID of the relay 13, and the like.

By describing nodes on the whole path in which blockchain nodes are located in the routing policy, a set identifier of a lower-level blockchain node set can be more flexible. For example, on the basis of the blockchain node sets SID1 and SID2, blockchain node sets of a next level are further included, such as a blockchain node set 1 belonging to the blockchain node set SID1 and a blockchain node set 2 belonging to the blockchain node set SID2, so that even if the blockchain node set 1 and the blockchain node set 2 adopt the same set identifier, the two sets can also be distinguished by a difference between the blockchain node sets SID1 and SID2.

The same blockchain node can be added to one or more blockchain node sets based on application needs. That is, blockchain nodes included in different blockchain node sets can overlap. For example, a blockchain node set C1 can include the node 21, the node 22, and the node 23, and a blockchain node set C2 can include the node 22, the node 23, the node 24, and the node 25, so that the node 22 and the node 23 belong to the blockchain node sets C1 and C2 at the same time.

The relay node can receive the blockchain message sent for the target blockchain node set from the connected blockchain node, and transmit the blockchain message through the technical solutions of this specification. For example, the relay node forwards the blockchain message to the target relay node only, but not to other relay nodes. Certainly, the relay node can also receive the blockchain message for the target blockchain node set from other relay nodes in the blockchain relay communication network. In this case, the relay node can be one of the target relay nodes, or the relay node may not be the target relay node, but needs to forward the blockchain message to the target relay node. For example, in the embodiment shown in FIG. 2, assume that the node 21 intends to send a blockchain message to a target blockchain node set, and a member of the target blockchain node set is the node 24. The relay 11 first receives the blockchain message from the node 21, and determines that a target relay node is the relay 13 connected to the node 24, and a route forwarding path between the relay 11 and the relay 13 is "relay 11-relay 12-relay 13", so that the relay 11 forwards the blockchain message to the relay 12. After receiving the blockchain message, the relay 12 finds that the target relay node is the relay 13, so that the relay 12 forwards the blockchain message to the relay 13. After receiving the blockchain message, the relay 13 finds that the target relay node is the relay 13 and the target blockchain node is the node 24, so that the relay 14 forwards the blockchain message to the node 24.

A blockchain node can indicate a target blockchain node set by adding a set identifier to a blockchain message. Correspondingly, after receiving the blockchain message, the relay node can read a set identifier from the blockchain message and determine a blockchain node set corresponding to the set identifier as the target blockchain node set corresponding to the blockchain message. If the tree-structure routing table mentioned above is adopted, the set identifier included in the blockchain message preferably includes information of all blockchain node sets in the corresponding path of the target blockchain node. For example, for the node 21 in FIG. 4, the set identifier included in the blockchain message can be expressed as "CID1/SID1". In this way, even if there is another "CID2/SID1", the set identifier can be clearly distinguished. Certainly, the set identifier included in the blockchain message can alternatively include only the set identifier of the target blockchain node set provided that the set identifier of each blockchain node set at all levels can be ensured to be unique. For example, the "CID1/SID1" is adjusted to "SID1".

As mentioned above, the relay node can generate a routing table configured for recording blockchain node sets to which blockchain nodes belong and connection relationships between the blockchain nodes and the relay node. For example, the tree-structure routing table or a routing table in another form can be used as the routing table. Correspondingly, the relay node can determine, by querying the routing table, target blockchain nodes registered to a target blockchain node set and a target relay node connected to the target blockchain nodes in the blockchain relay communication network, to transmit a blockchain message to the target blockchain nodes by using the target relay node.

After the relay node determines a target relay node: if the relay node is a target blockchain node, the relay node transmits, according to a target blockchain node connected to the relay node, the blockchain message to the target blockchain node; or if the relay node is not a target blockchain node, or there are other target relay nodes except the relay node, the relay node transmits the blockchain message to the target relay node, so that the target relay node forwards the blockchain message to the connected target blockchain node. When the relay node transmits the blockchain message to the target relay node, if the relay node can be directly connected to the target relay node, the blockchain message can be directly transmitted to the target relay node. If the relay node is not directly connected to the target relay node, the relay node can plan a transmission path between the relay node and the target relay node and send the blockchain message to a relay node at next hop in the transmission path, for the blockchain message to reach the target relay node along the transmission path.

Based on the previously described setting on blockchain node sets, a blockchain node can add a set identifier of a target blockchain node set to a to-be-transmitted blockchain message. A blockchain node in the target blockchain node set is a designated receiver of the blockchain message. In this way, after receiving the blockchain message, the relay node can read the set identifier from the blockchain message and determine the blockchain node set corresponding to the set identifier as the target blockchain node set corresponding to the blockchain message. After the target blockchain node set is determined, an actual target blockchain node, that is, the receiver of the blockchain message, can be determined in the target blockchain node set. It should be noted that for a blockchain node in the target blockchain node set, the previously described risk "the relay node leaks a message in a blockchain network to other blockchain networks" still exists. Therefore, the previously described mapping relationship is still needed for querying a target blockchain node, that is, determining, based on the mapping relationship, a target blockchain node matching target network identifier information and receiver identity information in the target blockchain node set. A principle of the previously described querying and matching process is the same as that of the querying and matching process in the embodiment shown in FIG. 3. Details are not described herein again.

Corresponding to the embodiments of a relay node side, this specification further provides embodiments of a blockchain node side. Descriptions involved in the embodiments of the relay node side is also applicable to the embodiments of the blockchain node side. This is not described below again.

Figure 5:
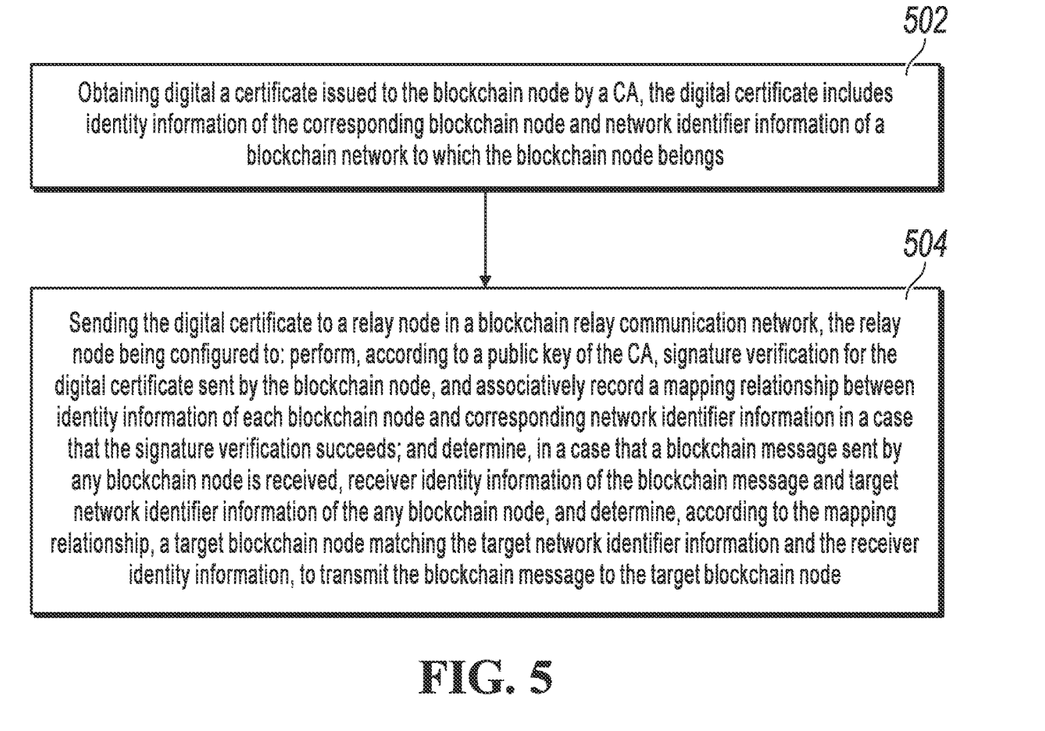
FIG. 5 is a flowchart of another message transmission method according to an explanatory embodiment.

Correspondingly, FIG. 5 is a flowchart of a message transmission method according to an explanatory embodiment. As shown in FIG. 5, the method can include the following steps:

Step 502: Obtaining digital a certificate issued to the blockchain node by a CA, the digital certificate includes identity information of the corresponding blockchain node and network identifier information of a blockchain network to which the blockchain node belongs.

Step 504: Sending the digital certificate to a relay node in a blockchain relay communication network, the relay node is configured to: perform, according to a public key of the CA, signature verification for the digital certificate sent by the blockchain node, and associatively record a mapping relationship between identity information of each blockchain node and corresponding network identifier information in a case that the signature verification succeeds; and determine, in a case that a blockchain message sent by any blockchain node is received, receiver identity information of the blockchain message and target network identifier information of the any blockchain node, and determine, according to the mapping relationship, a target blockchain node matching the target network identifier information and the receiver identity information, to transmit the blockchain message to the target blockchain node.

As mentioned above, the network identifier information of the blockchain network to which each blockchain node belongs is generated by the CA based on a genesis block maintained by the each blockchain node.

As mentioned above, the identity information of each blockchain node includes node identifier information and/or a node public key of the each blockchain node.

As mentioned above, in a case that the identity information includes the node identifier information and the node public key, if the signature verification for the digital certificate by the relay node succeeds, the relay node performs, by using the node public key included in the digital certificate, signature verification for the node identifier information included in the digital certificate.

As mentioned above, in a case that the signature verification for the node identifier information succeeds, the relay node establishes a transmission channel with the blockchain node, the transmission channel is configured for transmitting a blockchain message between the relay node and the blockchain node.

As mentioned above, the blockchain node can further obtain a digital certificate of the relay node, and perform signature verification for the digital certificate of the relay node by using the public key of the CA, to send the digital certificate of the blockchain node to the relay node in a case that the signature verification succeeds.

As mentioned above, the blockchain message includes a set identifier of a target blockchain node set; and the relay node is configured to determine the target blockchain node set corresponding to the set identifier, and determine, according to the mapping relationship, a target blockchain node matching the target network identifier information and the receiver identity information in the target blockchain node set.

As mentioned above, the blockchain node can further submit registration requests to the relay node, the registration request is used for instructing the relay node to register each blockchain node submitting the corresponding registration request to a blockchain node set indicated by the registration request.

As mentioned above, the digital certificate of each blockchain node includes a set identifier of a blockchain node set to which the each blockchain node belongs; and the relay node is configured to register, in a case that the signature verification for the digital certificate succeeds, the each blockchain node to the blockchain node set indicated by the set identifier included in the digital certificate.

As mentioned above, the blockchain message includes at least one of the following:

Block synchronization messages, consensus messages, and transaction synchronization messages.

Corresponding to the previously described method embodiments, this specification further provides embodiments of message transmission apparatuses.

Figure 6:
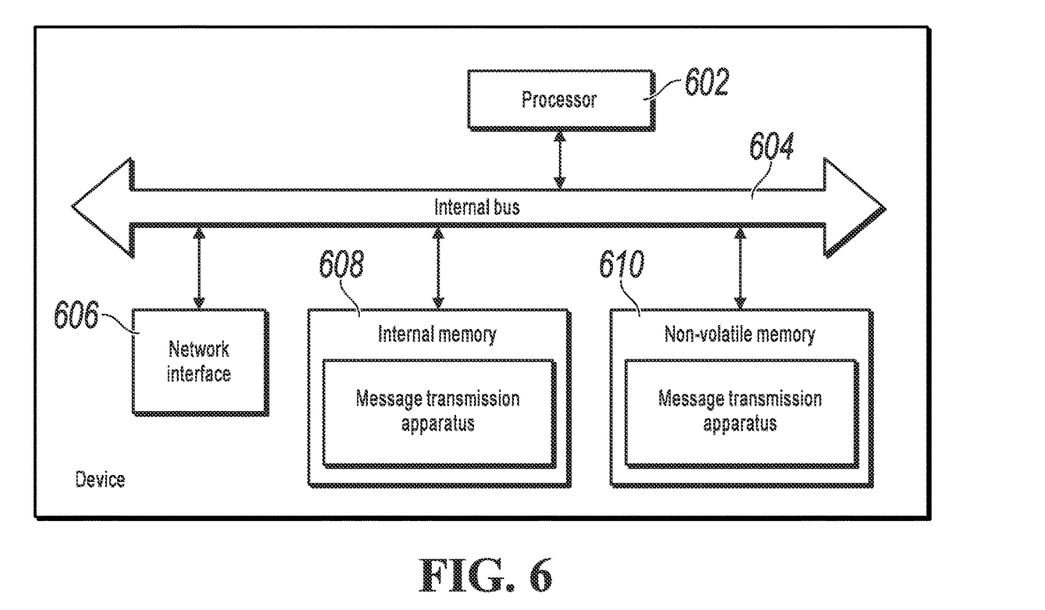
FIG. 6 is a schematic structural diagram of a device according to an explanatory embodiment.

FIG. 6 is a schematic structural diagram of a device according to an explanatory embodiment. Referring to FIG. 6, at a hardware level, the device includes a processor 602, an internal bus 604, a network interface 606, a memory 608, and a non-volatile memory 610, and certainly can further include hardware needed for other services. The processor 602 reads a corresponding computer program from the non-volatile memory 610 into the memory 608 and then executes the computer program, to form a message transmission apparatus at a logic level. Certainly, in addition to a software implementation, one or more embodiments of this specification do not exclude other implementations, for example, logic devices or a software-hardware combination. That is, execution bodies of the following processing procedures are not limited to logic units and can alternatively be hardware or logic devices.

Figure 7:
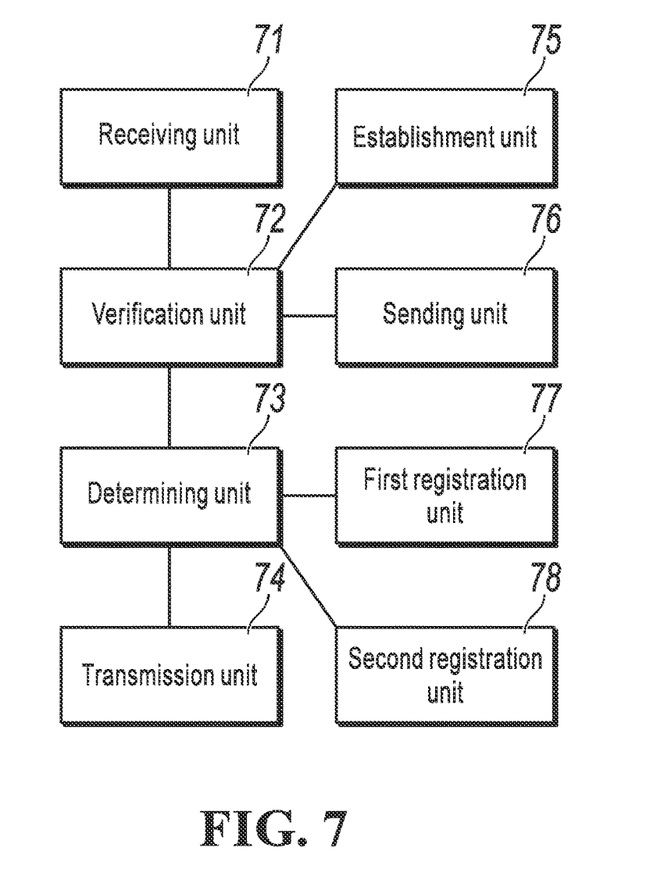
FIG. 7 is a block diagram of a message transmission apparatus according to an explanatory embodiment.

With reference to FIG. 7, in a software implementation, the message transmission apparatus is applicable to a relay node in a blockchain relay communication network, and can include:

a receiving unit 71, configured to receive a digital certificate sent by each blockchain node, the digital certificate includes identity information of the corresponding blockchain node and network identifier information of a blockchain network to which the blockchain node belongs;

a verification unit 72, configured to: perform signature verification for the digital certificate by using a public key of a CA issuing the digital certificate, and associatively record a mapping relationship between identity information of the each blockchain node and corresponding network identifier information in a case that the signature verification succeeds;

a determining unit 73, configured to: determine, in a case that a blockchain message sent by any blockchain node is received, receiver identity information of the blockchain message and target network identifier information of the any blockchain node, and determine, according to the mapping relationship, a target blockchain node matching the target network identifier information and the receiver identity information; and a transmission unit 74, configured to transmit the blockchain message to the target blockchain node.

Optionally, the network identifier information of the blockchain network to which each blockchain node belongs is generated by the CA based on a genesis block maintained by the each blockchain node.

Optionally, the identity information of each blockchain node includes node identifier information and/or a node public key of the each blockchain node.

Optionally, the verification unit 72 is further configured to:

in a case that the identity information includes the node identifier information and the node public key, if the signature verification for the digital certificate succeeds, perform, by using the node public key included in the digital certificate, signature verification for the node identifier information included in the digital certificate.

Optionally, the apparatus further includes:

an establishment unit 75, configured to establish a transmission channel with the corresponding blockchain node in a case that the signature verification for the node identifier information succeeds, the transmission channel is configured for transmitting a blockchain message between the relay node and the blockchain node.

Optionally, the apparatus further includes:

a sending unit 76, configured to send a digital certificate of the relay node to each blockchain node, where in a case that signature verification for the digital certificate of the relay node by the each blockchain node by using the public key of the CA succeeds, a digital certificate of the each blockchain node is sent to the relay node.

Optionally, the blockchain message includes a set identifier of a target blockchain node set; and the determining unit 73 is further configured to: determine the target blockchain node set corresponding to the set identifier, and determine, based on the mapping relationship, a target blockchain node matching the target network identifier information and the receiver identity information in the target blockchain node set.

Optionally, the apparatus further includes:

a first registration unit 77, configured to register, based on a registration request submitted by each blockchain node, the each blockchain node to a blockchain node set indicated by the registration request.

Optionally, the digital certificate of each blockchain node includes a set identifier of a blockchain node set to which the each blockchain node belongs; and the apparatus further includes:

a second registration unit 78, configured to: register, in a case that the signature verification for the digital certificate succeeds, the each blockchain node to the blockchain node set indicated by the set identifier included in the digital certificate.

Optionally, the blockchain message includes at least one of the following:

Block synchronization messages, consensus messages, and transaction synchronization messages.

Figure 8:
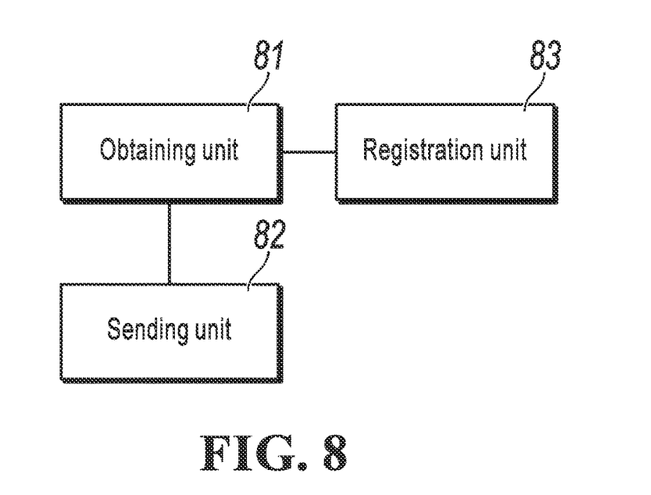
FIG. 8 is a block diagram of another message transmission apparatus according to an explanatory embodiment.

With reference to FIG. 8, in another software implementation, the message transmission apparatus is applicable to blockchain nodes, and can include:

an obtaining unit 81, configured to obtain a digital certificate issued to the blockchain node by a CA, the digital certificate includes identity information of the corresponding blockchain node and network identifier information of a blockchain network to which the blockchain node belongs; and a sending unit 82, configured to: send the digital certificates to a relay node in a blockchain relay communication network, the relay node is configured to: perform, based on a public key of the CA, signature verification for the digital certificate sent by the each blockchain node, and associatively record a mapping relationship between identity information of the each blockchain node and corresponding network identifier information in a case that the signature verification succeeds; and determine, in a case that a blockchain message sent by any blockchain node is received, receiver identity information of the blockchain message and target network identifier information of the any blockchain node, and determine, based on the mapping relationship, a target blockchain node matching the target network identifier information and the receiver identity information, to transmit the blockchain message to the target blockchain node.

Optionally, the network identifier information of the blockchain network to which each blockchain node belongs is generated by the CA based on a genesis block maintained by the each blockchain node.

Optionally, the identity information of each blockchain node includes node identifier information and/or a node public key of the each blockchain node.

Optionally, in a case that the identity information includes the node identifier information and the node public key, if the signature verification for the digital certificate by the relay node succeeds, the relay node performs, by using the node public key included in the digital certificate, signature verification for the node identifier information included in the digital certificate.

Optionally, in a case that the signature verification for the node identifier information succeeds, the relay node establishes a transmission channel with the blockchain node, the transmission channel is configured for transmitting a blockchain message between the relay node and the blockchain node.

Optionally, the obtaining unit 81 is further configured to:

obtain a digital certificate of the relay node, and perform signature verification for the digital certificate of the relay node by using the public key of the CA, to send the digital certificate of the blockchain node to the relay node in a case that the signature verification succeeds.

Optionally, the blockchain message includes a set identifier of a target blockchain node set; and the relay node is configured to: determine the target blockchain node set corresponding to the set identifier, and determine, according to the mapping relationship, a target blockchain node matching the target network identifier information and the receiver identity information in the target blockchain node set.

Optionally, the apparatus further includes:

a registration unit 83, configured to submit a registration request to the relay node, the registration request is used for instructing the relay node to register each blockchain node submitting the corresponding registration request to a blockchain node set indicated by the registration request.

Optionally, the digital certificate of each blockchain node includes a set identifier of a blockchain node set to which the each blockchain node belongs; and the relay node is configured to register, in a case that the signature verification for the digital certificate succeeds, the each blockchain node to the blockchain node set indicated by the set identifier included in the digital certificate.

Optionally, the blockchain message includes at least one of the following:

Block synchronization messages, consensus messages, and transaction synchronization messages.

The system, the apparatus, the module or the unit described in the previously described embodiments can be specifically implemented by a computer chip or an entity, or implemented by a product having a certain function. A typical implementation device is a computer. A specific form of the computer can be a personal computer, a laptop computer, a cellular phone, a camera phone, a smartphone, a personal digital assistant, a media player, a navigation device, an email transceiver device, a game console, a tablet computer, a wearable device or a combination of any devices of these devices.

In a typical configuration, the computer includes one or more processors (such as CPUs), one or more input/output interfaces, one or more network interfaces, and one or more memories.

The memory can include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which can implement storage of information by using any method or technology. The information can be a computer-readable instruction, a data structure, a program module, or other data. Examples of a storage medium of a computer include, but are not limited to, a phase-change memory (PRAM), a static random-access memory (SRAM), a dynamic random-access memory (DRAM), a RAM of another type, a random access memory (ROM), an electrically erasable programmable read-only memory (EEPROM), a flash memory or another memory technology, a compact disc read-only memory (CD-ROM), a digital versatile disc (DVD) or another optical storage device, a cassette tape, a magnetic disk storage, a quantum memory, a graphene-based storage medium or another magnetic storage device, or any other non-transmission medium, which can be configured to store information accessible by a computing device. According to limitations of this specification, the computer-readable medium does not include transitory computer-readable media, such as a modulated data signal and a modulated carrier.

It should be further noted that the terms "include", "comprise", or any variants thereof are intended to cover a non-exclusive inclusion. Therefore, a process, method, product, or device that includes a series of elements not only includes such elements, but also includes other elements not specified expressly, or can include inherent elements of the process, method, product, or device. Unless otherwise specified, an element limited by "include a/an . . . " does not exclude other same elements existing in the process, the method, the product, or the device that includes the element.

Embodiments of this specification are described above. Other embodiments fall within the scope of the appended claims. In some embodiments, the actions or steps recorded in the claims can be performed in sequences different from those in the embodiments and an expected result can still be achieved. In addition, the processes depicted in the accompanying drawings is not necessarily performed in the specific order or successively to achieve an expected result. In some implementations, multitasking and parallel processing is feasible or maybe advantageous.

The terms used in one or more embodiments of this specification are merely used to describe the embodiments but are not intended to limit one or more embodiments of this specification. The "a" and "the" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first," "second," "third," and the like can be used to describe various information in one or more embodiments of this specification, such information should not be limited to these terms. These terms are merely used to distinguish between information of the same type. For example, without departing from the scope of one or more embodiments of this specification, first information can also be referred to as second information. Similarly, second information can also be referred to as first information. Depending on the context, for example, the word "if" used herein can be interpreted as "while" or "when," or "in response to determination."

The previous descriptions are merely preferred embodiments of one or more embodiments of this specification, but are not intended to limit the one or more embodiments of this specification. Any modification, equivalent replacement, or improvement made within the spirit and principle of one or more embodiments of this specification shall fall within the protection scope of the one or more embodiments of this specification.

What is claimed is:

1. A computer-implemented method, comprising:
registering, by a relay node of a blockchain relay communication network in response to a registration request received from a blockchain node of a plurality of blockchain nodes, the blockchain node to a set indicated by the registration request, wherein a first digital certificate of a relay node corresponding to each blockchain node of the plurality of blockchain nodes is verified be to authentic based on a public key of a certification authority (CA) of the blockchain relay communication network;
in response to the first digital certificate of the relay node being verified, receiving, by the relay node, a second digital certificate of each blockchain node sent by each blockchain node of the plurality of blockchain nodes, wherein the second digital certificate of each blockchain node is issued by the CA of the blockchain relay communication network and comprises identity information of a corresponding blockchain node and a network identifier of a blockchain network that comprises the corresponding blockchain node;
verifying, by the relay node, that a digital signature of the second digital certificate is authentic based on the public key of the CA;
in response to verifying that the digital signature is authentic, recording, by the relay node, a mapping relationship between the identity information of the corresponding blockchain node and the network identifier of the blockchain network that comprises the corresponding blockchain node;
receiving, by the relay node from a sending blockchain node of the plurality of blockchain nodes, a blockchain message comprising a consensus message and including a set identifier of a target blockchain node set, wherein the target blockchain node set includes a set of blockchain nodes for performing consensus;
in response to receiving the blockchain message, determining, by the relay node, that
a) the sending blockchain node and a receiving blockchain node of the blockchain message are in a same blockchain network based on determining i) a receiver identity of the receiving blockchain node of the blockchain message and ii) a target network identifier of a target blockchain network that comprises the sending blockchain node, and
b) the receiving blockchain node is a node included in the target blockchain node set for performing the consensus;
determining, by the relay node according to the mapping relationship, a target blockchain node whose identifier is jointly marked by the target network identifier at a network level and the receiver identity at a node level;
establishing, by the relay node, a persistent connection between the target blockchain node and the relay node associated with the target blockchain node; and
transmitting, by the relay node, the blockchain message to the target blockchain node.

2. The computer-implemented method according to claim 1, wherein the target network identifier of the target blockchain network is generated by the CA based on a genesis block maintained by the corresponding blockchain node.

3. The computer-implemented method according to claim 1, wherein the identity information comprises at least one of a node identifier or a public key of the corresponding blockchain node.

4. The computer-implemented method according to claim 3, comprising:
performing, based on the public key comprised in the second digital certificate, signature verification for the node identifier comprised in the second digital certificate.

5. The computer-implemented method according to claim 1, comprising:
determining that the target blockchain node set corresponds to the set identifier,
wherein the target blockchain node is determined from the target blockchain node set.

6. The computer-implemented method according to claim 1, wherein registering the blockchain node to the blockchain node set comprises:
registering the blockchain node to the blockchain node set indicated by the set identifier.

7. The computer-implemented method according to claim 1, wherein the blockchain message comprises at least one of the following:
a block synchronization message, or a transaction synchronization message.

8. A non-transitory, computer-readable medium storing one or more instructions executable by a computer system to perform operations comprising:
registering, by a relay node of a blockchain relay communication network in response to a registration request received from a blockchain node of a plurality of blockchain nodes, the blockchain node to a set indicated by the registration request, wherein a first digital certificate of a relay node corresponding to each blockchain node of the plurality of blockchain nodes is verified be to authentic based on a public key of a certification authority (CA) of the blockchain relay communication network;
in response to the first digital certificate of the relay node being verified, receiving, by the relay node, a second digital certificate of each blockchain node sent by each blockchain node of the plurality of blockchain nodes, wherein the second digital certificate of each blockchain node is issued by the CA of the blockchain relay communication network and comprises identity information of a corresponding blockchain node and a network identifier of a blockchain network that comprises the corresponding blockchain node;
verifying, by the relay node, that a digital signature of the second digital certificate is authentic based on the public key of the CA;
in response to verifying that the digital signature is authentic, recording, by the relay node, a mapping relationship between the identity information of the corresponding blockchain node and the network identifier of the blockchain network that comprises the corresponding blockchain node;
receiving, by the relay node from a sending blockchain node of the plurality of blockchain nodes, a blockchain message comprising a consensus message and including a set identifier of a target blockchain node set, wherein the target blockchain node set includes a set of blockchain nodes for performing consensus;
in response to receiving the blockchain message, determining, by the relay node, that
a) the sending blockchain node and a receiving blockchain node of the blockchain message are in a same blockchain network based on determining i) a receiver identity of the receiving blockchain node of the blockchain message and a target network identifier of a target blockchain network that comprises the sending blockchain node, and
b) the receiving blockchain node is a node included in the target blockchain node set for performing the consensus;
determining, by the relay node according to the mapping relationship, a target blockchain node whose identifier is jointly marked by the target network identifier at a network level and the receiver identity at a node level;
establishing, by the relay node, a persistent connection between the target blockchain node and the relay node associated with the target blockchain node; and
transmitting, by the relay node, the blockchain message to the target blockchain node.

9. The non-transitory, computer-readable medium according to claim 8, wherein the target network identifier of the target blockchain network is generated by the CA based on a genesis block maintained by the corresponding blockchain node.

10. The non-transitory, computer-readable medium according to claim 8, wherein the identity information comprises at least one of a node identifier or a public key of the corresponding blockchain node.

11. The non-transitory, computer-readable medium according to claim 10, comprising operations of:
performing, based on the public key comprised in the second digital certificate, signature verification for the node identifier comprised in the second digital certificate.

12. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
registering, by a relay node of a blockchain relay communication network in response to a registration request received from a blockchain node of a plurality of blockchain nodes, the blockchain node to a set indicated by the registration request, wherein a first digital certificate of a relay node corresponding to each blockchain node of the plurality of blockchain nodes is verified be to authentic based on a public key of a certification authority (CA) of the blockchain relay communication network;

in response to the first digital certificate of the relay node being verified, receiving, by the relay node, a second digital certificate of each blockchain node sent by each blockchain node of the plurality of blockchain nodes, wherein the second digital certificate of each blockchain node is issued by the CA of the blockchain relay communication network and comprises identity information of a corresponding blockchain node and a network identifier of a blockchain network that comprises the corresponding blockchain node;

verifying, by the relay node, that a digital signature of the second digital certificate is authentic based on the public key of the CA;

in response to verifying that the digital signature is authentic, recording, by the relay node, a mapping relationship between the identity information of the corresponding blockchain node and the network identifier of the blockchain network that comprises the corresponding blockchain node;

receiving, by the relay node from a sending blockchain node of the plurality of blockchain nodes, a blockchain message comprising a consensus message and including a set identifier of a target blockchain node set, wherein the target blockchain node set includes a set of blockchain nodes for performing consensus;

in response to receiving the blockchain message, determining, by the relay node, that a) the sending blockchain node and a receiving blockchain node of the blockchain message are in a same blockchain network based on determining i) a receiver identity of the receiving blockchain node of the blockchain message and ii) a target network identifier of a target blockchain network that comprises the sending blockchain node, and b) the receiving blockchain node is a node included in the target blockchain node set for performing the consensus;

determining, by the relay node according to the mapping relationship, a target blockchain node whose identifier is jointly marked by the target network identifier at a network level and the receiver identity at a node level;

establishing, by the relay node, a persistent connection between the target blockchain node and the relay node associated with the target blockchain node; and transmitting, by the relay node, the blockchain message to the target blockchain node.

13. The computer-implemented system according to claim 12, wherein the target network identifier of the target blockchain network is generated by the CA based on a genesis block maintained by the corresponding blockchain node.

14. The computer-implemented system according to claim 12, wherein the identity information comprises at least one of a node identifier or a public key of the corresponding blockchain node.

* * * * *

UNITED STATES PATENT AND TRADEMARK OFFICE
CERTIFICATE OF CORRECTION

PATENT NO. : 11,722,318 B2  
APPLICATION NO. : 17/362692  
DATED : August 8, 2023  
INVENTOR(S) : He Sun, Chao Zeng and Jiang Wang Page 1 of 1

It is certified that error appears in the above-identified patent and that said Letters Patent is hereby corrected as shown below:

In the Claims

In Column 20, Line 33, Claim 1, please replace "be to" with -- to be --;

In Column 21, Line 55, Claim 8, please replace "be to" with -- to be --;

In Column 22, Line 22, Claim 8, please replace "and a" with -- and ii) a --;

In Column 22, Line 67, Claim 12, please replace "be to" with -- to be --.

Signed and Sealed this
Twenty-fourth Day of October, 2023

Katherine Kelly Vidal
*Director of the United States Patent and Trademark Office*